United States Patent [19]
Lee et al.

[11] 3,856,671
[45] *Dec. 24, 1974

[54] CLOSED-LOOP OZONE GENERATING AND CONTACTING SYSTEM

[75] Inventors: Hanju Lee, Columbia; Harvey Milton Rosen, Laurel, both of Md.

[73] Assignee: W. R. Grace & Co., New York, N.Y.

[ * ] Notice: The portion of the term of this patent subsequent to July 24, 1990, has been disclaimed.

[22] Filed: Nov. 21, 1972

[21] Appl. No.: 308,612

Related U.S. Application Data

[63] Continuation-in-part of Ser. No. 204,503, Dec. 3, 1971, Pat. No. 3,748,262.

[52] U.S. Cl. .................. 210/63, 210/192, 210/194, 210/218
[51] Int. Cl. ............................................. C02b 1/38
[58] Field of Search .............. 55/26; 210/26, 60, 63, 210/150, 151, 192, 194, 195, 205, 209, 218; 204/149, 176

[56] References Cited
UNITED STATES PATENTS

| | | | |
|---|---|---|---|
| 511,330 | 12/1893 | Fahrig | 210/192 X |
| 782,021 | 2/1905 | Friberg | 210/63 |
| 996,560 | 6/1911 | Bradley | 210/192 |
| 3,660,277 | 5/1972 | McWhirter et al. | 210/195 X |
| 3,685,656 | 8/1972 | Schaefer | 210/195 |

*Primary Examiner*—Thomas G. Wyse
*Attorney, Agent, or Firm*—Michael J. McGreal

[57] ABSTRACT

By this system, water can be treated with ozone and/or oxygen in a closed-loop cycle, thus conserving the high oxygen content gas. The system comprises as a principal feature a pressure-swing fractionator which removes nitrogen, carbon dioxide and water vapor from a feed gas, producing an oxygen enriched gas which flows to a contactor or an ozonator. The oxygen enriched gas from the ozonator contains from about 1 to 7 percent ozone. This gas mixture, or solely an oxygen stream, is then contacted with water to be treated. Purified water is recovered, and excess oxygen and/or oxygen and enriched in nitrogen, forms a recycle gas which is combined with a charge of air and flowed to the pressure-swing fractionator to begin another cycle. The pressure-swing fractionator serves the dual simultaneous purpose of producing the necessary oxygen enriched gas for subsequent use and maintaining a low nitrogen level throughout the closed-loop.

23 Claims, 2 Drawing Figures

CLOSED-LOOP OZONE GENERATING AND CONTACTING SYSTEM

This application is a continuation-in-part application of Ser. No. 204,503, filed Dec. 3, 1971, now U.S. Pat. No. 3,748,262.

This invention relates to a closed-loop ozone and/or oxygen liquid treating system utilizing a pressure-swing fractionator for generating oxygen and controlling nitrogen levels within the closed loop. In one embodiment, this invention comprises an apparatus and method for the efficient generation of oxygen enriched air from which ozone can be generated, followed by the use of the resulting oxygen enriched air-ozone stream in the treatment of a contaminated liquid medium with recycle of any unused oxygen enriched air, along with impurities to the pressure-swing oxygen generator. In a second embodiment, this invention comprises an apparatus and method for the efficient generation of oxygen enriched air and the use of this oxygen enriched air in the treatment of a contaminated liquid medium, with recycle of any unused oxygen enriched air along with impurities to the pressure-swing oxygen generator. These closed-loop systems using a pressure-swing oxygen generating system have many advantages which will be further set out.

Ozone and oxygen have many uses as purifying and disinfecting agents. They have been used for bleaching, disinfecting and clarifying drinking water, dissipating organics in industrial waste streams prior to disposal and in treatment of municipal waste water to reduce the TOC (total organic carbon) content and COD (chemical oxygen demand). There is no doubt that oxygen and particularly ozone are very effective materials for use in any of these processes. However, no matter how effective they are, they still must compete on a cost basis with other materials and processes. The principal feature of this invention is that it provides a system, particularly useful in water pruification or waste water treatment, which requires a decreased initial capital cost, as well as decreased operating costs. By decreasing both the initial and long term costs, oxygenation and ozonation now have competitive advantages over existing techniques. Further description in this application will be directed to waste water treatment, however, it should be borne in mind that the system may be used in combination with essentially any purifying, disinfecting or bleaching operation, municipal or industrial.

A particular problem in waste water treatment is the TOC (total organic carbon) and COD (chemical oxygen demand) of the treatment plant effluent stream. The COD of this stream should be as low as possible. Ozone and oxygen effectively lower the COD and TOC content of effluents from waste water treatment plants. They remove odors and color from water and destroy pathogenic organisms. Residual ozone will decompose rather rapidly, since it has a half life of about 20 minutes in water and thereby produces no problems. Tertiary waste treatment using ozone has the potential decreasing waste water treatment time, while considerable decreasing the COD and TOC content, as well as destroying residual bacteria. Secondary waste treatment is more effectively conducted using oxygen and ozone, which is a more severe oxidant and tends to destroy bacteria colonies necessary for effective secondary treatment. Ozone containing gas can at times, be used in secondary treatment.

The published prior art in regard to the present process is best evidenced in technical publications of the U.S. Department of Interior and various literature articles. Repast No. TWRC-4(PB187758), Ozone Treatment Of Secondary Effluents From Wastewater Treatment Plants, is illustrative of an available Department of Interior Report. Illustrative of a literature article is the paper, "Practical Aspects of Water and Waste Water Treatment By Ozone" by E. W. J. Diaper, which was presented at the 162nd National Meeting of the American Chemical Society in Washington, D. C. Other available prior art known to the inventors consists of studies conducted at the Blue Plains Wastewater Treatment Plant in Washington, D. C. These studies have consisted of closed-loop oxygen-ozone treatment of wastewater, but using a liquid or compressed oxygen as the initial oxygen source. The present system is a distinct improvement over such prior art systems, and particularly by integrating a pressure-swing oxygen generator into the closed loop.

The pressure-swing oxygen generator provides two principal and distinct advantages when introduced into a closed-loop system. Firstly, it provides an efficient method of removing some or all of the nitrogen from air so as to provide an oxygen enriched air stream with an oxygen content of from 30 percent to 95 percent oxygen. The air component which generally is not removed in pressure-swing air fractionation is argon, which is present in about a 4 percent to 5 percent content in a 95 percent oxygen stream. This pressure-swing technique provides continuous on site generation of oxygen as needed, using ambient air as the source material. This eliminates the need for large cryogenic storage tanks and having to depend on shipments. The per pound cost of oxygen is also less than when a compressed or cryogenic oxygen source is used.

The second, and probably the most significant, advantage in using a pressure-swing oxygen generator integrated into the system, is that recycle oxygen enriched air will contain increased nitrogen from having been in contact with the waste water. Waste water will contain dissolved nitrogen due to the partial pressure of nitrogen in the atmosphpere, as well as due to formation from waste decomposition. In a closed-loop system, this nitrogen will tend to build up to an equilibrium level which would be about that of the atmosphere exterior to the closed-loop. In order to avoid this nitrogen level build-up in a closed-loop, systems using compressed or cryogenic oxygen as the oxygen source require that all the waste water prior to treatment must undergo an elaborate deaeration technique. This requires a large deaeration chamber, high capacity vacuum pump and a waste water pump not required when a pressure-swing generator is used. The pressure-swing oxygen generator in the present system serves the dual concurrent function of yielding a system which is less complex in equipment and operation, and less costly in regard to initial capital outlay and operation. It produces the required oxygen, while simultaneously maintaining nitrogen at a low level. In this invention, no deaeration step or equipment is required.

It is, therefore, a prime object of this invention to set out a closed-loop system for generating an oxygen enriched gas, treat a fluid medium with the oxygen enriched gas, and recycle a partially oxygen enriched gas to the oxygen producing source for reuse.

It is also a prime object of this invention to set out a closed-loop system for generating ozone from an integral oxygen enriched gas producing source, treat a fluid medium with the ozone containing gas, and recycle a partially oxygen enriched gas to the oxygen producing source for reuse.

It is also a significant object of this invention to provide a closed-loop ozone water treatment system wherein a pressure-swing oxygen generator serves the concurrent dual function of producing an oxygen enriched gas feed for an ozone generator, and serves also to remove nitrogen in the closed-loop system.

Additional objects of this invention are to provide an oxygen enriched gas stream for secondary waste treatment and an ozone containing oxygen enriched gas for tertiary waste treatment with recycle of a partially oxygen enriched gas from secondary and/or tertiary waste treatment to the pressure-swing oxygen generator.

In brief summary, this invention comprises a closed-loop oxygen generation and oxygen and/or ozone water treatment system, and particularly a system useful in waste water treatment. The system has a pressure-swing oxygen generator as an integral part of the closed-loop. The pressure-swing oxygen generator fractionates air and recycle gas, removing nitrogen which is vented to the atmosphere, providing an oxygen enriched gas of up to 95 percent oxygen for feeding to water treatment or to an ozonator. The pressure-swing oxygen generator thereby automatically controls the amount of nitrogen within the system. The effluent ozone and/or oxygen containing streams are flowed to one or more contactors where there is intimate contact between the ozone and/or oxygen containing streams and the water or waste water. Gas from the contactors, which now contains an increased nitrogen content, is flowed on recycle via a dryer to the pressure-swing oxygen generator, along with fresh air. The pressure-swing oxygen fractionates this combined feed removing nitrogen. This oxygen enriched gas is then flowed to water treatment or to the ozonator and the cycle repeated.

In this specification, the effluent from the pressure-swing oxygen generator will be termed oxygen enriched gas. This term is equivalent to oxygen enriched air.

Figure 1:
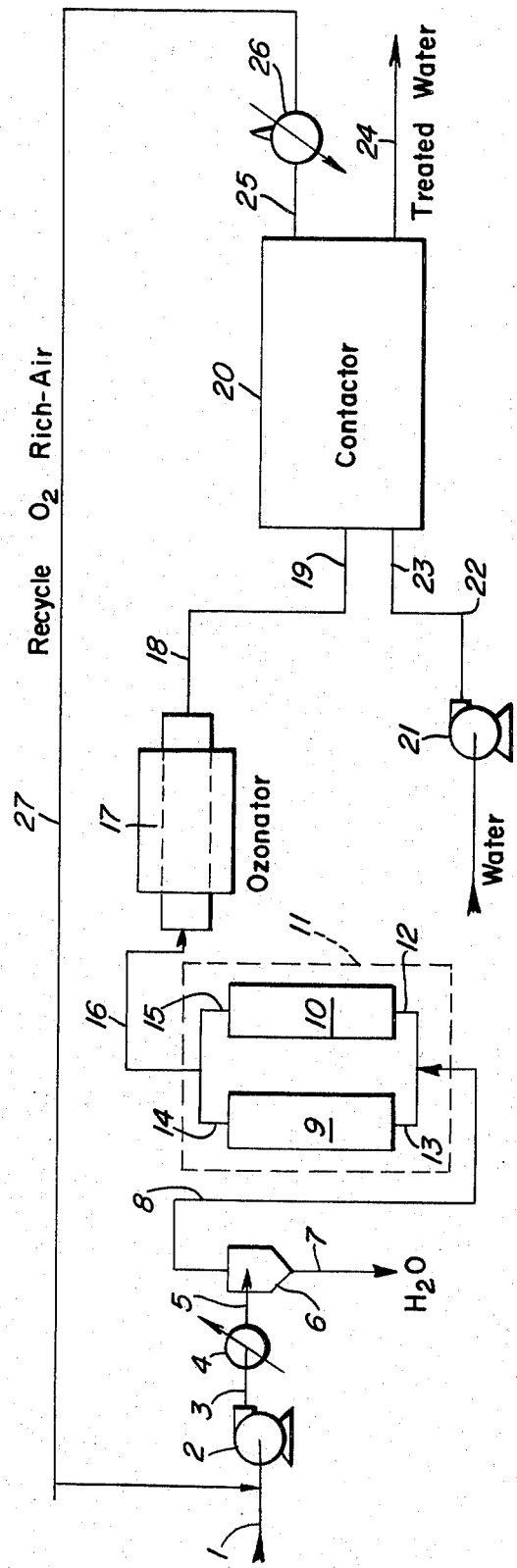
FIG. 1 is a schematic diagram of the closed-loop ozone treatment system containing one contactor stage.

FIG. 1 illustrates a preferred system layout of one mode of the present invention. The feature of prime significance is the incorporation of a pressure-swing oxygen generator into the system at a point prior to the ozonator, but subsequent to the combining of recycle oxygen enriched gas and air. In more detail, fresh air and recycle oxygen rich gas mix in pipe 1. This comixture is pulled through compressor 2, which increases the pressure of this gas to about 25 psi to 150 psi. This gas comixture then passes via pipe 3 to chiller 4. Condensed water and the gas comixture pass via pipe 5 to separator 6 where the water is removed at pipe 7. The comixture gas, which is now at an increased pressure and fairly dry, passes by pipe 8 to the pressure-swing oxygen generator 11. The pressure-swing oxygen generator, enclosed in the dash outline in the Figure, consists of at least two adsorbent beds designated here 9 and 10. Piping 12 or 13 delivers the feed gas comixture to the proper adsorbent bed. Two beds are set out here strictly for purposes of simplicity. A three adsorbent bed device is very useful, with a four or more adsorbent device having certain advantages.

The theory of pressure-swing fractionation, as it is also designated, is that adsorbents have a greater selectivity for at least one component of a mixture. For gaseous fractionation, crystalline aluminosilicate zeolites are used as the adsorbent. These zeolites selectively adsorb nitrogen from an air stream, allowing oxygen to pass through the adsorbent bed. By the use of two or more adsorbent beds, at least one bed can be on an oxygen producing phase while one or more beds are being regenerated, that is, depleted of adsorbed nitrogen. On completion of the regeneration phase, the adsorbent bed is then switched to the adsorbing phase of selectively adsorbing nitrogen and producing an oxygen enriched stream. Thereafter, by a selective switching "swinging" of the adsorbent beds from an adsorption phase to a regeneration phase and so on, a continuous oxygen enriched stream can be produced. Nitrogen removed from the adsorbent bed on regeneration can be passed into the atmosphere. U.S. patents which illustrate the state-of-the-art of pressure-swing fractionation, and which are considered to be very useful in the present system are U.S. Pat. Nos. 3,564,816, 3,237,377, 3,086,339, 3,102,013, 3,636,679, 3,104,162, 3,138,439, 3,252,268, 3,142,547 and 2,944,627.

An oxygen enriched gas exits the pressure-swing fractionator at pipe 16. This gas will have a composition of from about 30 percent to 95 percent oxygen, with the remainder being argon and other residual components of air. As an example, when this gas is 95 percent oxygen, the residual component will be argon. However, when the enriched gas is from 40 percent to 80 percent oxygen, there will be significant amounts of argon and nitrogen present, as well as minor amounts of other gases. Preferably, the oxygen enriched gas will contain about 60 to 90 percent oxygen. The pressure-swing zeolitic adsorbent will also remove any water vapor and carbon dioxide from the input gas.

From pipe 16, this oxygen enriched gas passes into ozonator 17. This may be an ozonator utilizing tubular electrodes or one utilizing flat electrodes. Each operates on the same principal. The oxygen enriched gas is passed between pairs of high potential electrodes and low potential electrodes which are shielded with a delectric. The electrode gap is usually about 1 to 3 millimeters. The glow discharge which is maintained in this gap produces the ozone. Depending on the oxygen content of the enriched gas, the ozone content will range from about 1 percent to 7 percent by weight. Useful ozone generators are produced by The Welsbach Corporation, Philadelphia, Pa., and the Ozonator Corporation, Batavia, New York. Preferred ozone generators are those of an improved design disclosed in Italian Pat. No. 869,360, issued July 15, 1970. These improved ozone generators have a lower operating cost.

The oxygen enriched gas containing ozon then flows via pipes 18 and 19 to contractors 20. Water to be treated is pumped by pump 21 through pipes 22 and 23 and into contactors 20. The exact contactor construction may vary. This may be a countercurrent or cocurrent single or multiple chamber or column continuous type contactor, or it may be a high shear or low shear batch type contactor. Further, there may be a combination of these techniques. The ozone containing oxygen enriched gas is sparged into the liquid by a means to achieve maximum exchange of the oxygen and ozone into the water. These are not critical features of this invention, and actually any effective type of gas-liquid contacting system can be used. In most instances, other plant requirements will dictate the type of contactor used.

Purified water exits the contactor chamber at pipe 24. A recycle gas composed of a partially oxygen enriched gas which now contains an increased nitrogen level due to the partial depletion of oxygen and transfer of dissolved nitrogen from the treated water, exits the contactor chamber at pipe 25. This gas may optionally pass through a heater 26 to decompose any residual ozone. Thereafter, the recycle gas flows by pipe 27 to pipe 1 for comixture with air in pipe 1 and a repeat of the cycle.

Figure 2:
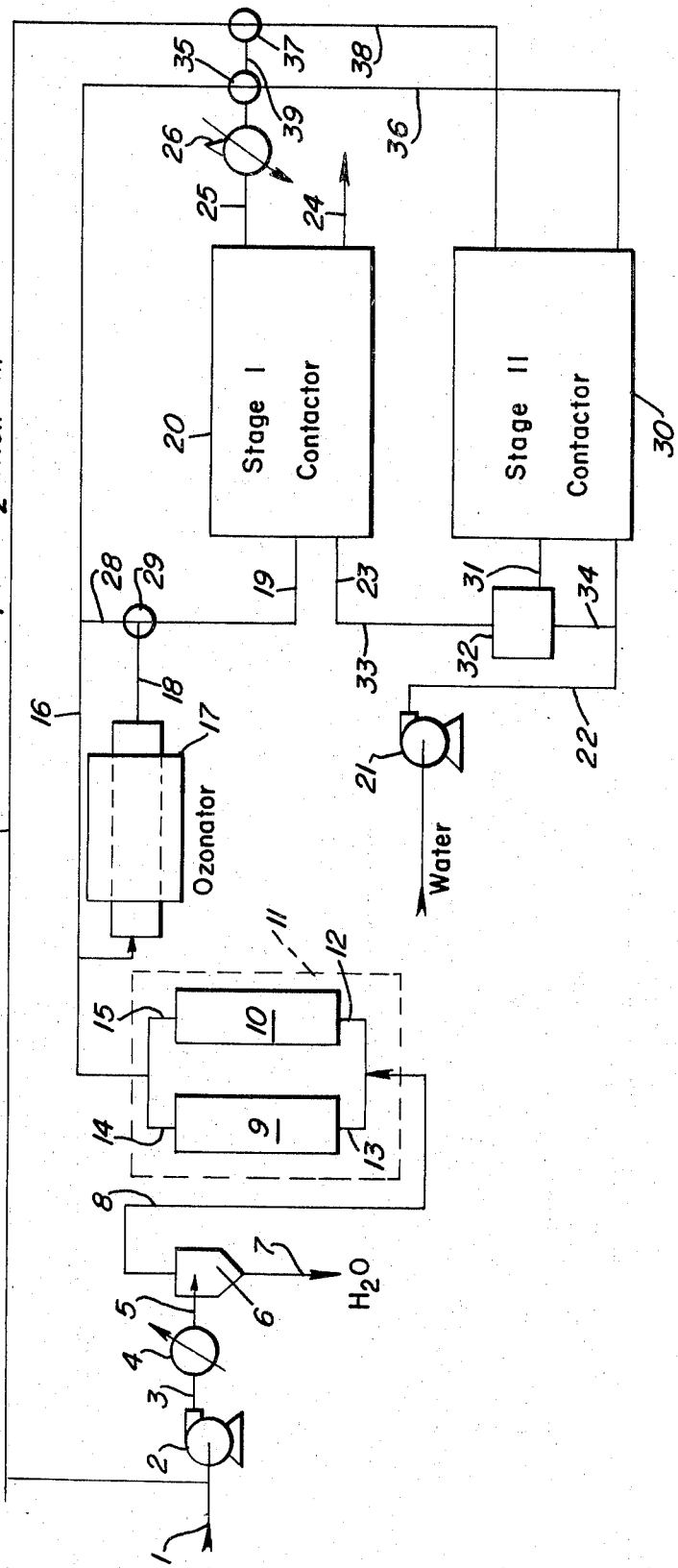
FIG. 2 is a schematic diagram of the closed-loop system wheren there are two stages of contactors which use ozone and/or oxygen as the feed gas.

FIG. 2 sets a variation of the device and process of FIG. 1. In FIG. 2, there is shown an additional contactor in the closed-loop system, with stage II contactors 30 being waste water secondary treatment contactors and stage I contactors 20 being tertiary treatment contactors. The input waste material will be effluent from a primary waste treatment stage and is pumped by pump 21 via conduit 22 to contactors 30. These contactors are of a type similar to contactors 20. After thorough contacting, effluent water from contactors 30 flows by pipe 31 to separator 32 where any solid sludge material in the effluent stream is separated out and returned by conduit 34 to contactors 30. Separator 32 is particularly necessary when activated sludge processing is carried out in contactors 30. Effluent water flows from separator 32 by conduits 33 and 23 to contactors 20 for tertiary treatment which is essentially a disinfection of the water. Ozone containing oxygen enriched gas flows via conduits 18 and 19 and valve 29 to contactors 20. The contacting of the bacteria laden input water with ozone oxidatively destroys this bacteria and also oxidatively destroys remaining organics, some of which are responsible for a slight coloration of the input water to contactors 20. Treated water exits at 24, with at least a partially ozone depleted oxygen rich gas exiting at 25 for passage through heater 26 which decomposes any residual ozone. This oxygen rich gas is then conducted by valve 35 and conduit 36 to contactors 30. Additional oxygen is supplied to the at least partially oxygen depleted gas via conduit 16 and valve 35, which oxygen enriched gas flows directly from the pressure-swing oxygen fractionator 11. Some additional oxygen will usually have to be added to the gas stream input to contactor 30. This oxygen enriched gas is thoroughly contracted with the waste liquid mixture in contactors 30 so that the off-gas is substantially depleted in oxygen. Depending on the oxygen content of the off-gas from the contactors 30, this gas is either vented at 34 or recycled by conduits 38 and 27 and valve 37 to air input at 1.

This process embodiment is essentially a countercurrent flow of the waste water material to be treated and the treating oxidizing gas. A strong oxidant such as ozone is necessary for effective tertiary treatment. However, in secondary waste treatment, which usually consists of an activated sludge technique, a strong oxidant such as ozone would destroy the bacteria which are necessary for effective secondary waste treatment processes. Ozone is used mainly for final disinfection treatment (tertiary). However, if solely an oxidative reaction (nonbacterial) process is being conducted in contactors 30, ozone containing oxygen enriched gas could also be used in this process operation. In such an instance, ozone decomposition heater 26 would be deleted and ozone containing gas flowed from contactors 20, and/or ozone containing oxygen enriched gas flowed directly from the ozonator.

In another process embodiment using the process scheme of FIG. 2, concurrently with ozone containing oxygen enriched gas flow to contactors 20, an oxygen enriched gas is flowed from the pressure-swing oxygen fractionator via conduits 16 and 36 and valve 35 to contactors 30. After thorough contacting, the off-gas from contactor 30 flows by conduits 38 and 27 and valve 37 to air input at 1. The off-gas from contactors 20 in this embodiment will flow through conduit 25 to heater 26 to destroy any residual ozone, and then by conduits 39 and 27 via valve 37 to air input at 1. In this embodiment, there is no flow of oxygen enriched gas from contactors 20 to contactors 30.

In a further embodiment of the process scheme of FIG. 2, an oxygen enriched gas can be flowed to contactors 20 without passage through the ozonator. This oxygen enriched gas is flowed to contactor 20 through conduits 28 and 19 via valve 29. This feature of the process allows for an oxygen enrichment of the ozone containing gas which is beneficial when the off-gas from contactors 20 is to be flowed to contactors 30, and when the ozonator is out of use for any reason.

The amount of flows of waste water and oxygen enriched gas to contactors 30 and impure water and ozone containing oxygen enriched gas to contactors 20 will depend on the degree of contaminant content of these waste streams, the content of ozone and/or oxygen in the gas streams, and the effectiveness of the oxygen and ozone contacting apparatus. Generally, municipal waste treatment plants requires about .25 to 1 ton oxygen for each million gallons of waste water to be treated. This would be for oxygen secondary waste water treatment and oxygen-ozone tertiary treatment. The amount oxygen enriched gas does not have to be closely controlled in this process, since excess oxygen enriched gas is recycled for reuse. Most systems which use oxygen vent the off-gas to the atmosphere, thereby losing a valuable process material. For this reason, it is preferred to operate at about a 10 to 50 percent excess of oxygen relative to the total biological and chemical oxygen demands. The use of excess oxygen will also increase the oxygen content of the treated water flowing from the system which is ecologically beneficial. When industrial wastes are being treated, the desirable quantity of oxygen relative to the waste material to be treated can easily be calculated after analysis of the waste stream.

The closed-loop systems of FIG. 1 or FIG. 2 can be continuously repeated, since the pressure-swing fractionator continuously determines the nitrogen gas level in the system. This nitrogen level in the closed-loop system can be maintained constant, regardless of the dissolved nitrogen content of the water which undergoes treatment or the degree of nitrogen level adjustment is an automatic and inherent feature of this system. Depending on the adjustment of the pressure-swing oxygen generator, the amount of nitrogen removed can range from about 10 percent to essentially complete removal.

In more detail concerning this pressure-swing oxygen generator, preferred devices are set out in U.S. Pat. Nos. 3,086,339 and 3,142,547 and U.S. application Ser. No. 275,398, filed July 26, 1972. These patents and application set out improvements on the device of U.S. Pat. No. 2,944,627. The basic pressure-swing systems consist of essentially two phases, the adsorption phase and the regeneration phase. The adsorption phase can be optimized by maintaining the bed temperature at about ambient or below, and allowing the column to approach the breakthrough point prior to swinging. The breakthrough point is that point where the adsorbent is at full capacity. These are the principal operational techniques for optimizing the adsorption phase. However, there are many techniques that can be utilized to optimize the regeneration phase. Regeneration is the removal of the adsorbed component from the adsorbent bed. Steps which are conducted during regeneration are a depressurization of the adsorbent bed to ambient pressure or below and the flowing of a purge gas through the adsorbent bed. Optionally, the bed may also be heated. U.S. Pat. No. 2,944,627 discloses the feature of using a portion of product gas from the bed on regeneration. This product gas may flow directly from the adsorbent bed on the adsorbing phase or from a purge tank. In U.S. Pat. No. 3,142,547, there is disclosed a method of using depressurizing gas as an effective backwash or purge gas. Depressurizing gas will have a higher oxygen content than input gas and, as such, will be a good purge medium. By the use of the depressurizing gas along with product gas the purge gas, the pressure-swing system is made more economical. U.S. Pat. No. 3,086,339 discloses a three adsorbent bed system utilizing a depressurization gas and a product gas purge. Such a system will produce oxygen enriched gas in a fairly high volume. U.S. Ser. No. 275,398 discloses a two adsorbent bed-single tank system which utilizes a dual sequential bed pressure equalization technique and is very efficient in conserving product gas.

The adsorbent used in the adsorbent beds of these pressure-swing devices is usually a synthetic zeolite such as Zeolite A, X or Y exchanged with potassium, alkali earth ions, rare earth ions, transition metal ions or mixtures of these ions; or a naturally occurring zeolite such as erionite, mordenite, chabazite, gmelinite, heulandite or faujasite in its natural or metal ion exchanged form. Very useful adsorbents are alkaline earth exchanged Zeolite A and Zeolite X, and particularly these zeolites exchanged with calcium, barium and strontium ions.

In actual system operation, input air and recycle gas are comixed and compressed to a pressure of about 25 psi to 50 psi. This compressed gas passes through the condenser where water vapor is removed as liquid water, and thereafter to the pressure-swing fractionator. The ratio of air to recycle gas in this comixture will depend on the amount of oxygen needed to replace that which has been converted to ozone and that used in the contacting step. In general, air will have to be added in a ratio of about five to 10 times the amount of oxygen that is required to replace that used in the previous cycle. Since air is only about 20 percent oxygen, at least five volumes of air must be added for each volume of oxygen required. Higher volumes of air are usually added, since some of the oxygen enriched product gas from the pressure-swing fractionator is used as a purge gas within the fractionator. The dried air-recycle gas comixture then passes through the pressure-swing fractionator where nitrogen is decreased in concentration or fully removed. At this stage, essentially all carbon dioxide and water vapor are removed. The resulting oxygen enriched gas, now containing about 60 to 90 percent oxygen, is fed to the ozonator. The ozonator effluent contains 3 to 6 percent ozone, with the oxygen content being decreased 4.5 to 9 percent. This gas flows to the contactor, where it is thoroughly contacted with water. Continuous concurrent contacting of the water and oxygen enriched gas containing ozone provides maximum contact and use of ozone. During this contacting, dissolved nitrogen leaves the water phase, with ozone and some oxygen being dissipated in the water phase. The resulting nitrogen enriched gas forms the recycle gas, which is combined with air for initiation of another cycle.

The recycle gas loop can optionally contain gas scrubber or drier means. That is, this part of the system can contain gas scrubbers for carbon dioxide and carbon monoxide, and a chiller or absorptive drier to remove some of the water content. A suitable absorptive drier material is silica gel.

As is evident, this system could be used for any liquid treatment. However, it is most effective in water purification treatment. This can consist of producing potable water, or the treatment of industrial or municipal waste streams. In the treatment of municipal waste streams, this system can be used for secondary or tertiary treatment or both. Further uses will be obvious to those in the art as situations develop.

What is claimed is:

1. A closed-loop water treatment process using an oxidizing gas comprising:
   a. flowing at least one portion of an oxygen enriched gas to an ozonator wherein from about 1 to 7 percent ozone is formed; said oxygen enriched gas being the product of a pressure-swing fractionator;
   b. flowing the oxygen enriched gas containing ozone to a first gas-liquid contactor;
   c. flowing a partially purified water to be treated with said oxygen enriched gas containing ozone to said first gas-liquid contactor from an additional gas-liquid contactor;
   d. thoroughly contacting said partially purified water and said oxygen enriched gas containing ozone in said first gas-liquid contactor producing a treated water which is substantially purified and a gas at least partially depleted of ozone and oxygen;
   e. flowing impure water from an inlet to said additional gas-liquid contactor;
   f. flowing said gas at least partially depleted of ozone and oxygen to said additional gas-liquid contactor for thorough contacting with said impure water, partially purifying said impure water, and said gas at least partially depleted of ozone and oxygen is further depleted in at least one component;
   g. flowing said gas further depleted in at least one component from said additional gas-liquid contactor as a recycle gas and comixing said recycle gas with a portion of air;
   h. flowing the comixture of air and recycle gas through a pressure-swing fractionator wherein nitrogen is selectively removed, thereby yielding an oxygen enriched gas; and i. repeating step (a), thereby producing a closed-loop water treatment system.

2. A process as in claim 1 wherein said impure water is a waste water.

3. A process as in claim 2 wherein additional oxygen enriched gas is added to said gas at least partially depleted of ozone and oxygen of (d) prior to being flowed to said additional gas-liquid contactor.

4. A process as in claim 1 wherein said oxygen enriched gas contains from about 30 to 95 percent oxygen.

5. A process as in claim 1 wherein one portion of said oxygen enriched gas is flowed to an ozonator, and a second portion of said oxygen enriched gas is flowed to said additional gas-liquid contactor for contacting with said impure water, with a partially purified water flowed from said additional gas-liquid contactor, and the resulting gas from said additional contactor which has been substantially depleted of oxygen recycled for comixing with a portion of air.

6. A process as in claim 1 wherein during said pressure-swing fractionation, residual amounts of carbon dioxide and water vapor, together with nitrogen, are removed.

7. A process as in claim 6 wherein the oxygen enriched gas from said pressure swing fractionator contains from about 30 to 95 percent oxygen.

8. A process as in claim 7 wherein said pressure-swing fractionator consists of at least two adsorbent beds whereby an oxygen enriched gas is continuously produced.

9. A process as in claim 8 wherein said pressure-swing fractionator consists of two adsorbent beds, each adsorbent bed containing a crystalline aluminosilicate zeolite adsorbent.

10. A process as in claim 8 wherein said pressure-swing fractionator consists of three adsorbent beds, each adsorbent bed containing a crystalline aluminosilicate zeolite adsorbent.

11. A process as in claim 6 wherein subsequent to comixing said recycle gas and said air, the pressure of the comixture is increased to the range of about 25 psi to 150 psi, with water vapor being removed from the increased pressure stream.

12. A process as in claim 11 wherein said water vapor is removed by condensation to a liquid.

13. A closed-loop apparatus for the oxidizing gas treatment of water comprising:
   a. a pressure-swing fractionator capable of removing nitrogen from an input comixture gas stream containing at least oxygen and nitrogen, thereby producing an oxygen enriched gas;
   b. an ozonator;
   c. conduit means for flowing said oxygen enriched gas from said pressure-swing fractionator to said ozonator;
   d. a first gas-liquid contactor and an additional gas-liquid contactor;
   e. conduit means for flowing an oxygen enriched gas containing ozone from said ozonator to said first gas-liquid contactor;
   f. conduit means for flowing a gas at least partially depleted of ozone and oxygen from said first gas-liquid contactor to said additional gas-liquid contactor;
   g. conduit means for flowing impure water to said additional gas-liquid contactor from an inlet;
   h. conduit means for flowing partially purified water to said first gas-liquid contactor from said additional gas-liquid contactor;
   i. conduit means for removing purified treated water from said gas-liquid contactor;
   j. conduit means for removing from said additional gas-liquid contactor a gas further depleted in at least one component as a recycle gas;
   k. means for adding air to said recycle gas; and
   l. conduit means for flowing the comixture of recycle gas and air to said pressure-swing fractionator.

14. An apparatus as in claim 13 which includes conduit means for flowing oxygen enriched gas from said pressure-swing fractionator to said additional contactor.

15. An apparatus as in claim 13 wherein said pressure-swing fractionator contains at least two adsorbent beds, each adsorbent bed containing a zeolite adsorbent.

16. An apparatus as in claim 15 wherein the oxygen enriched gas stream contains from about 30 to 90 percent oxygen.

17. An apparatus as in claim 15 wherein said pressure-swing fractionator contains at least three adsorbent beds, each adsorbent bed containing a zeolite adsorbent.

18. An apparatus as in claim 13 wherein the effluent from said ozonator contains from about 1 to 7 percent ozone.

19. An apparatus as in claim 13 wherein the conduit means for flowing said comixture of recycle gas and air to said pressure-swing fractionator includes a compressor which increases the pressure of said comixture.

20. An apparatus as in claim 19 wherein the conduit means for conducting said comixture of recycle gas and air to said pressure-swing fractionator includes a water vapor removing device between said compressor and said pressure-swing fractionator.

21. An apparatus in claim 20 wherein said water vapor removing device is a condenser.

22. An apparatus as in claim 13 wherein the conduit means of (f) includes an ozone decomposing means.

23. An apparatus as in claim 22 wherein said ozone decomposing means is a heater.

* * * * *